E. S. JOHNSON.
FEEDING DEVICE FOR ANIMALS.
APPLICATION FILED FEB. 24, 1917.

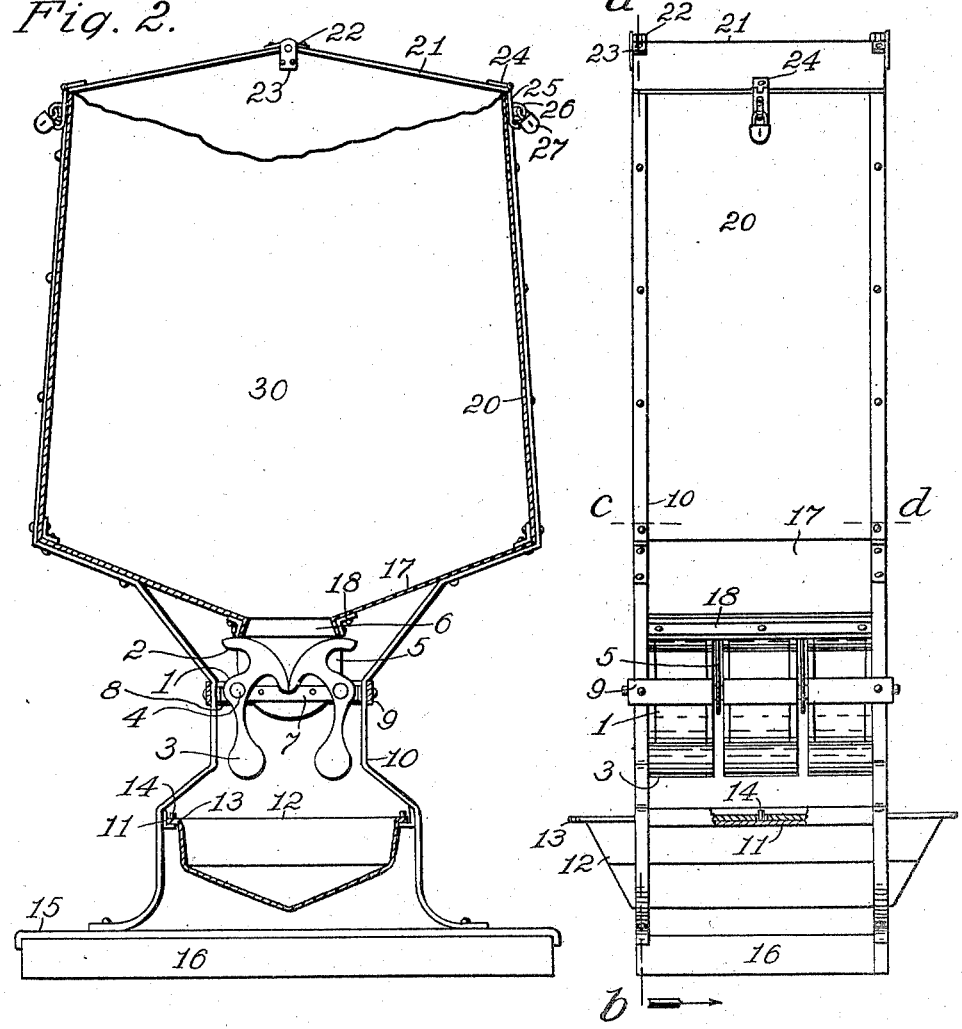
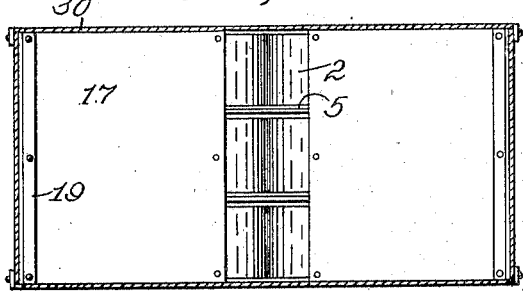

1,249,765.

Patented Dec. 11, 1917.
2 SHEETS—SHEET 2.

Inventor,
E. S. Johnson, by
G. C. Kennedy,
Attorney.

UNITED STATES PATENT OFFICE.

ERNEST S. JOHNSON, OF WEBSTER CITY, IOWA.

FEEDING DEVICE FOR ANIMALS.

1,249,765.          Specification of Letters Patent.          Patented Dec. 11, 1917.

Application filed February 24, 1917. Serial No. 150,690.

*To all whom it may concern:*

Be it known that I, ERNEST S. JOHNSON, a citizen of the United States of America, and a resident of Webster City, Hamilton county, Iowa, have invented certain new and useful Improvements in Feeding Devices for Animals, of which the following is a specification.

My invention relates to improvements in feeding devices for animals, and the object of my improvement is to supply animal-controlled automatically reacting charge-delivery means for furnishing to stock, such as hogs, portions of feed, without delivering more than can be used by the animal, and thus preventing waste.

Other improvements are more particularly hereinafter described and pointed out in the claims.

Figure 5:
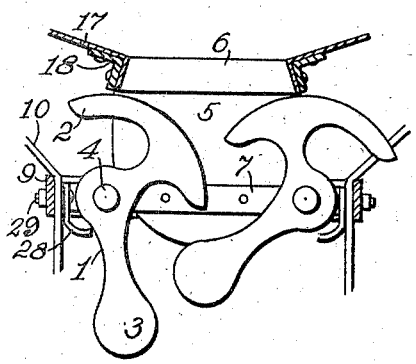
Figure 6:
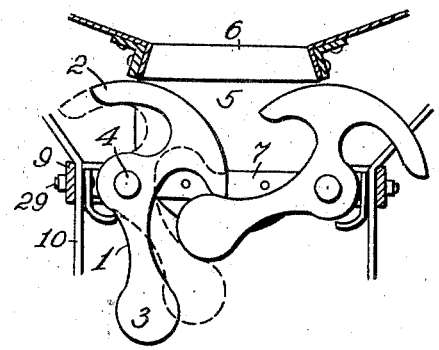
Figure 7:
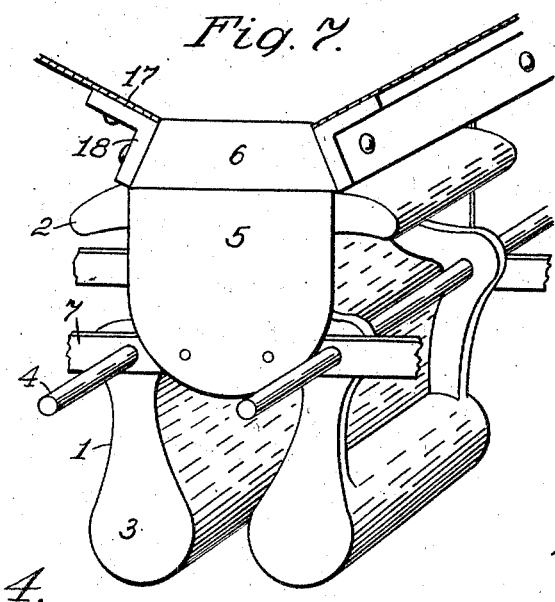
Figure 8:
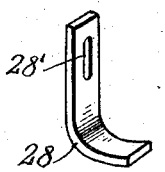
Figure 4:
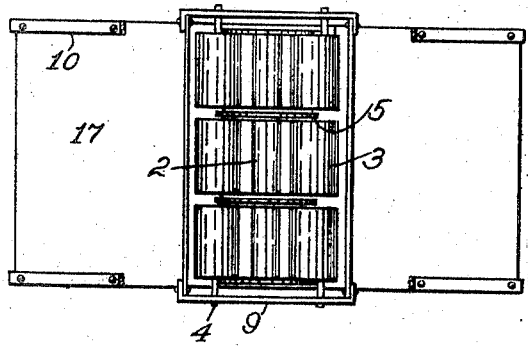

The said objects are accomplished by the means which are hereinafter fully explained and claimed, and illustrated in the accompanying drawings, in which Figure 1 is an elevation of my improved feeding device, with parts broken away; Fig. 2 is a cross-section thereof taken on the line 2—2 of said Fig. 1, looking in the direction indicated by the arrow; Fig. 3 is a horizontal section of the device, looking downwardly, on the line 3—3 of said Fig. 1; Fig. 4 is a horizontal section of said device, taken below the hopper, looking upwardly; Figs. 5 and 6 are enlarged detail views of the animal-controlled valves, showing them in different relative operative positions; Fig. 7 is a detail view, in perspective, more enlarged, of said valves, showing them when not being actuated, and Fig. 8 is a perspective view of the hook-shaped bar 28.

Similar numerals of reference denote corresponding parts throughout the several views.

In the drawings, I show a hopper having spaced vertical end walls 30 and upwardly converging side walls 20, closed below by a bottom 17 formed of plates converging at a small inclination to a longitudinal medial delivery opening having downwardly divergent walls 6 formed by bending the inner ends of the plates 17 over angle-bars 18. Small plates 23 are fixed at the middles of the upper ends on the outer faces of the end walls 30 and orificed to receive pintles of hinges 22, the latter connecting swinging closures 21. Said closures have hinged slotted hasps 24—25 which detachably receive staples 26 on the upper parts of the end walls 20, and may be secured together by means of padlocks 27.

The hopper is supported on spaced standards 10, whose lower ends are secured to horizontal bars 15 mounted on a base-block 16. These standards leave the bottom plates 17 midway and are directed convergingly downwardly to a rectangular inclosing bar or frame 9, then are carried downwardly vertically, thence bent outwardly divergingly, thence downwardly vertically, at the latter angle providing a location where horizontal angle-bars 11 are secured on their inner faces, furnishing ledges provided with upright studs 14 located midway between the standards.

The numeral 12 denotes a pan or receptacle having sloping side walls and bottom and having a horizontally extending rim 13, the latter supported removably upon the ledges of the angle-bars 11. These rims 13 have orifices to receive the studs 14, whereby animals while feeding are prevented from displacing the receptacle, yet permitting the receptacle to be removed by lifting it away from the studs, in order to permit it to be emptied or cleansed.

The numeral 5 denotes a depending plate or bounding shield mounted on cross-bars 7 of the rectangular frame-bar 9 with its upper horizontal edge at the level of the delivery opening of the chute 6 of the hopper. These plates 5 are located at each end of the chute 6, closing same at the ends, and one or more of them may be positioned at intervals between the ends of the chute as divisional contrivances between which may be housed and supported the valves of my device.

One or more pairs of coacting counterpart valves 1 may be employed just below the chute 6 to regulate the delivery of feed from the hopper above to the receptacle 12 below them. The valves are alike in form but reversed in position and are pivotally hung on horizontal fixed shafts 4, whose ends are supported by the rectangular frame-bar 9. As shown in Figs. 5, 6 and 7, each valve 1 comprises a body having at the top a part 2 in the form of a sector, and having at the lower end a pendulous weight 3. These weights 3 are positioned at such an angle to the sectors 2 that when not being actuated they cause the adjacent longitudinal edges of the sectors to abut and contact with each other, thus closing the chute 6, while leaving a trough-shaped space between them.

A supply of feed, such as grain or other loose movable materials having been deposited in the hopper, a hog or other animal may actuate the valvular bottom of the device by pushing one of the pendulous parts 3 of a valve 1 upwardly and inwardly to a position such as is shown in Fig. 5. This will cause the sector 2 of the valve so pushed to swing away from the contacting sector of the coacting valve, which leaves openings or a passage between said sectors as also between the mentioned part 3 and the sector of the inactive valve 1, through which feed can flow downwardly into the receptacle 12 as long as said valve is kept up by the animal. As soon as the animal releases the valve in order to feed, the weighted part 3 of the valve swings the valve back to its former closed position, shutting off the supply of feed. If the valve 1 is pushed upwardly by the animal to a position indicated by the full lines in Fig. 6, the weighted part 3 contacts with the edge of the sector 2 on the inactive valve 1, closing the delivery passage. This might occur when the animal pushes its head too far into the receptacle, so delivery of feed is thus stopped. As shown by the dotted lines in Fig. 6, in case another animal approaches from the opposite side of the device and pushes up the inactive valve 1 while the other valve is in operation, the weights 3 are swung into contact to close the delivery passage, so that no waste can occur by reason of the interference.

The hopper may be of any desired length, and have as many pairs of valves 1 as may be necessary to supply a number of animals. Adjustable stops may be supplied, as for example, the hook-shaped bars shown in Figs. 5 and 6, which are slotted at 28' to be adjustably mounted on bolts 29 passed through the frame 9, and whose inwardly bent lower ends may engage the valves to limit their swing in one direction. The limiting means may be of any kind desired, as I do not desire to confine myself to the type shown.

Attention is particularly called to the form of the hopper, wherein the inclination of the bottom plates 17 is small, and the end walls 20 are upwardly converged, whereby a mass of grain or other feed is prevented from forming an arch in the hopper, the above conformation effectually preventing arching and insuring constant delivery of the feed.

Various alterations may be effected in the forms and arrangements of the parts of my device, without departing from the invention or the scope of its protection.

Having described my invention, what I claim as new and desire to secure by Letters Patent, is:

1. A feeding device, comprising a hopper having a delivery opening, and a pair of coacting normally co-engaging counterpart valves suspended movably below said opening and having pendulous parts adapted to retain the valves in closed positions.

2. A feeding device, comprising a hopper having a delivery opening, and a pair of gravity-controlled pendulous valves supported movably to open or close said opening when either is swung in a certain direction relative to the other.

3. A feeding device, comprising a hopper having a delivery opening, and a pair of like mutually coacting pivoted valves having sector shaped heads and having oppositely-extending pendulous weights serving to rock said heads into contact to close said delivery opening when the valves are swung apart to open a passage between them and then released.

4. A feeding device, comprising a hopper having in its bottom a delivery-chute, division-contrivances positioned dependingly below said chute, and pairs of movable pendulous co-engaging valves supported between the division-contrivances, adapted to normally close the interspaces thereof, each valve movable limitedly apart from its coacting valve to open a passage therebetween leading from said delivery-chute.

5. A feeding device, comprising a hopper having a delivery opening, a pair of like coacting swinging valves supported below said opening adapted to normally contact to close said opening, either valve when swung in one direction opening a passage between it and the inactive valve from said opening and when swung farther in the same direction contacting with the inactive valve to close the passage, the inactive valve being adapted when swung toward said active valve in one direction to contact therewith and close the passage between them.

6. A feeding device, comprising a hopper having a delivery opening, a pair of like pendulous co-engaging coacting valves swingingly supported below said opening adapted to normally contact to close the opening, and either valve when swung in one direction adapted to open a passage to the said opening, and means for adjustably limiting the movement of said valves in an opposite direction.

Signed at Waterloo, Iowa, this 17th day of Feb. 1917.

ERNEST S. JOHNSON.

Copies of this patent may be obtained for five cents each, by addressing the "Commissioner of Patents, Washington, D. C."